Patented Apr. 30, 1946

2,399,603

UNITED STATES PATENT OFFICE 2,399,603

ALKAMIDO CELLULOSE ETHERS AND PROCESS OF MAKING SAME

John B. Rust, West Orange, and William H. Van Delden, Cedar Grove, N. J., assignors to Montclair Research Corporation, a corporation of New Jersey No Drawing. Application August 15, 1944, Serial No. 549,624

10 Claims. (Cl. 260—231)

The present invention relates to cellulose derivatives and to the processes of making the same. It is an object of this invention to provide derivatives of cellulose which are soluble in dilute alkalies.

It is a further object of this invention to make available cellulose derivatives which are useful in textile sizing compositions. It is an object of this invention to provide compounds usable as wash- and laundering-fast cellulose textile sizes.

It is a further object to provide cellulose derivatives which may be dissolved in alkali solution and spun into fibers in a suitable precipitating bath for the production of artificial silk or precipitated in the form of film or foils. It is also an object of this invention to provide paper sizing and modifying agents.

Other objects and advantages will become apparent from the more detailed description of the invention given hereinafter. Such detailed description should not be construed as limiting but only by way of explanation and illustration since numerous variations may be made by those skilled in the art without departing from the scope and spirit of the present invention.

The derivatives of the present invention may be formed by the reaction of an alkali cellulose derivative, as for instance, soda cellulose, potash cellulose, lithium cellulose, quaternary ammonium cellulose and the like with halo-alkyl derivatives of amido compounds of relatively short chain carboxylic and sulfonic acids. The reaction may be effected in the cold in some instances, and in others by the application of heat. As instances of the halo-alkyl amido compounds of the present invention we may use acetamidomethyl chloride, acetamidomethyl bromide, propionamidomethyl chloride, benzamidomethyl chloride, acetamidoethyl chloride, benzene sulfonamidomethyl chloride and the like. In general, the chloro-compounds which may be reacted with the cellulose of the present invention may, to obtain aqueous alkali-soluble ethers, be represented by $$R-X-NH-\underset{R'}{CHCl}$$

wherein R stands for alkyl, aryl, alkaryl, or cycloalkyl; that is, a hydrocarbon radical having not more than six carbon atoms, R' stands for hydrogen or a group like R; and X stands for CO or $SO_2$. When the radicals R or R' contain more than about 10 carbon atoms the cellulose ethers do not have adequate solubility in aqueous alkalies. We may first react cellulose with sodium hydroxide, for instance, to form soda cellulose. After aging the soda cellulose to a satisfactory degree as explained below, it is mixed when cold with the chloralkylamido derivative. A reaction is effected either in the cold or the reaction mixture is allowed to warm up and further heating is applied. It may be seen that the reactants of the present invention as typified in the above formula may be made by condensing an amido derivative $R-X-NH_2$ with an aldehyde R'CHO in the presence of an anhydrous hydrohalide acid. In the reaction of the present invention we may employ a diluent for the chloralkyl amido derivative.

In the reaction of the present invention it is suggested that the following may occur, representing cellulose as Cell—OH:

$$Cell-OH + R-X-NH-\underset{R'}{CHCl} \longrightarrow Cell-O-\underset{R'}{CH}-NH-X-R$$

Thus an amidoalkyl ether of the cellulose is formed. Although this invention is particularly concerned with low substituted cellulose derivatives which are soluble in dilute alkalies, we may also form more highly substituted derivatives which are soluble in organic solvents and which may be formulated as coating compositions, compression and injection moldings and the like. The above is given by way of possible explanation only and should not be construed as limiting, since we do not wish to be limited to any theoretical explanation of the present invention.

The cellulose derivatives of this invention are soluble in alkalies with cooling or not, according to the number and character of substituted groups. Thus we may make a derivative which is insoluble in alkali at ordinary temperatures, but which is readily soluble by cooling the alkali suspension to about 0° C. Such solutions are valuable as textile sizing agents. The solutions, usually about 1% to 10% strength, are applied to cotton, linen, rayon or the like goods, on the padder, partially dried and coagulated by using a solution of an acid, acid salt or a precipitating concentrated salt solution. The treated textile is washed thoroughly after coagulating and then dried. A firm hand is imparted to the fabric which is resistant to laundering and the ordinary cleansing agents. The finishing may be applied at practically any convenient stage of processing, such as before kierboiling, before dyeing, drying, during mercerizing, and the like. Since the derivatives of the present invention contain in some cases a partially reacted amido group, they may be caused to undergo further reaction, as for instance, with acids, aldehydes, alkalies and the like. Thus, if used as a sizing material, the derivatives of the present invention may be subjected to a formaldehyde and heat treatment after coagulation, which causes a further reaction with consequent firmer fixation of the size to the textile. Textile sized with the compounds of the present invention and treated as described above appear to be more receptive to dyestuffs capable of dyeing silk, hair, and the like.

Cellulose in its various forms may be used in the present invention. However, after forming the alkali or quaternary ammonium cellulose, we prefer to age it to secure some controlled degradation until the desired viscosity is obtained. The viscosity may be varied, both by using different forms and sources of cellulose, by introducing more or less reactant and by degrading the cellulose to a greater or lesser degree. In the present invention we may use inert diluents as desired, such as ethylene dichloride, carbon tetrachloride, benzene, ethyl ether, heptane, and the like. When making the alkali cellulose, concentrations of from 15% to 50% of alkali may be used, although greater or lesser concentrations may be employed. This is also true of the quaternary ammonium hydroxides. When using these latter materials solution of the cellulose sometimes occurs. In such cases the solutions may be diluted with alkali metal hydroxide solutions before reaction. Such quaternary ammonium hydroxides may be trimethyl benzyl ammonium hydroxide, tetraethyl ammonium hydroxide, diethyl dipropyl ammonium hydroxide, diethyl piperidinium hydroxide, methyl pyridinium hydroxide, and the like.

The proportions of reactants may be varied within very wide limits of for instance from 5% to about 100% of the cellulose. For several reasons it may be desirable to use the excess of the chloralkyl derivative. For instance, in some cases the chlorine is merely replaced by a hydroxyl group before reaction or a resinification reaction can occur with consequent improverishment of the mixture of the reactant. On the other hand a greater proportion of reactant may be used to accelerate the reaction which then may be terminated before completion if desired. As stated above, the reactants of the present invention are formed by the reaction of the amido compound with an aldehyde in the presence of a hydrohalide. As the amido compounds we may use acetamide, propionamide, butyramide, pentanoamide, caproamide, benzamide, ethanesulfonamide, propanesulfonamide, pentenesulfonamide, benzene sulfonamide, and the like. In some cases we may also employ imides such as succinimide, glutarimide, and the like. We may also employ amidines which are the ammonium analogs of the carboxyamides, such as acetamidine, propionamidine and the like. As the aldehydes of the present invention we may use formaldehyde, acetaldehyde, propionaldehyde, benzaldehyde, glyoxal and the like. As the hydrohalides we may use hydrogen chloride, hydrogen bromide, and the like.

Therefore the process of the present invention consists in allowing cellulose to react with an excess of a 15% to a 50% aqueous solution of an alkali such as sodium hydroxide to form alkali cellulose. To this mixture is then added from 5% to about 100% (based on the dry cellulose) of a reaction product of an acid amide R—X—NH$_2$ wherein R contains not more than 6 carbon atoms and wherein X stands for carbonyl or sulfuryl, with an aldehyde R'CHO of not more than 7 carbon atoms, in the presence of an anhydrous hydrogen halide, and reacted for a period from 1 to about 5 hours. The reactants are mixed in the cold and the reaction temperature is between about 50° C. and 100° C. and preferably is about 70° C., higher temperatures being employed when a degraded product (that is, one producing a lower viscosity) is desired, but in any case it is desirable to start the reaction at a low temperature. Afterwards the reaction mixture is acidified as desired. The product is then coagulated and can be filtered, washed and dried. The dried product is capable of dissolving in dilute aqueous alkalies to form a homogeneous solution useful particularly as a wash-fast size for fabrics.

The following examples are given to illustrate the products and processes of the present invention. All proportions are in parts by weight.

*Example 1.*—A solution of N-(chloromethyl)-acetamide in dioxan was prepared as follows: 15 parts of acetamide was dissolved in 65 parts of dioxan. 7.5 parts of paraformaldehyde and 1 part of anhydrous sodium sulfate were added and 10 parts of dry hydrogen chloride was passed into the mixture. A sludge was obtained which contained 22.6% of the product.

53 parts of alkali cellulose containing 15 parts of cellulose and 38 parts of 20% sodium hydroxide and aged at 20° C. for 72 hours were mixed with 49 parts of the N-(chloromethyl)-acetamide sludge. The mixture was thoroughly homogenized and reacted for 5 hours at 70° C. The material was then acidified, washed with water and dried. A white fibrous material was obtained. A solution in sodium hydroxide solution was made by mixing 8 parts of the above acetamidomethyl cellulose ether, 80 parts of 20% sodium hydroxide and 112 parts of crushed ice. A smooth dispersion of medium viscosity was obtained.

*Example 2.*—A solution of N-(alpha-chloroethyl)-acetamide in dioxan was prepared by dissolving 29.5 parts of acetamide in 150 parts of dioxan, adding 22 parts of acetaldehyde and 1 part of anyhydrous sodium sulfate and passing 19.3 parts of hydrogen chloride into the mixture. 101.8 parts of a sludge was obtained which contained 54% of the product. 51 parts of soda cellulose which had been aged at 18° C. for 72 hours and which contained 15 parts of cellulose in 20% aqueous sodium hydroxide were mixed with 51 parts of the above sludge of N-(alpha-chloroethyl)-acetamide. This mixture was homogenized and reacted at 70° C. for 5 hours. The material was then washed with water and finally with acetone and dried. A solution in sodium hydroxide was formed from 4 parts of the acetamidoethyl cellulose, 40 parts of 20% sodium hydroxide solution and 56 parts of crushed ice. A low viscosity homogeneous slightly cloudy solution was formed.

*Example 3.*—A solution of N-(alpha-chlorobutyl)-acetamide in dioxan was prepared from 29.5 parts of acetamide, 150 parts of dioxan, 36 parts of butyraldehyde and 1 part of sodium sulfate by passing in 19.1 parts by hydrogen chloride. A solution containing some suspended solid was obtained which contained 35% of the product. 51 parts of soda cellulose (aged for 72 hours at 18° C. and containing 15 parts of cellulose in 20% sodium hydroxide) were mixed with 21 parts of the above solution containing 7.5 parts of N-(alpha-chlorobutyl)-acetamide. The mixture was homogenized and reacted at 70° C. for 5 hours. The material was washed with water, acidified, and finally washed with acetone and dried. A solution was made from 4 parts of the acetamidobutyl cellulose thus obtained, 40 parts of 20% sodium hydroxide solution and 56 parts of crushed ice. A clear solution of medium viscosity was secured.

*Example 4.*—51 parts of soda cellulose, aged 72 hours at 18° C. and containing 15 parts of cellulose in 20% sodium hydroxide, were mixed with 84.2 parts of the solution of N-(alpha-chlorobutyl)-acetamide as described in Example 3 and containing 30 parts of product. The mixture was homogenized and heated at 70° C. for 5 hours. The material was acidified, washed with water and dried. A solution in sodium hydroxide solution was made by mixing 4 parts of the above acetamidobutyl cellulose, 40 parts of 20% sodium hydroxide solution and 56 parts of crushed ice. The solution had a high viscosity and was clear.

*Example 5.*—A solution of N-(chloromethyl)-benzenesulfonamide in dioxan was formed from 29.3 parts of benzenesulfonamide, 150 parts of dioxan, 7.15 parts of paraformaldehyde, 1 part of anhydrous sodium sulfate by passing in 9.3 parts of hydrogen chloride. A clear yellow solution was obtained which contained 24.8% of the product. 57 parts of soda cellulose which had been aged 72 hours at 18° C. and which contained 20 parts of cellulose in 20% sodium hydroxide were mixed with 81 parts of the above solution containing 20 parts of N-(chloromethyl)-benzenesulfonamide. The mixture was stirred and heated at 70° C. for 5 hours. The material was neutralized, washed with water and dried. A solution was made from 4 parts of the benzenesulfonamidomethyl cellulose, 40 parts of 20% sodium hydroxide solution and 56 parts of crushed ice. A solution of medium viscosity was secured which contained some undissolved fibers.

*Example 6.*—A solution of N-(alpha-chloroethyl)-benzenesulfonamide in dioxan was prepared from 39.3 parts of benzene-sulfonamide, 150 parts of dioxan, 11 parts of acetaldehyde, 1 part of anhydrous sodium sulfate by passing in 9.5 parts of hydrogen chloride. A clear solution was obtained which contained 26% of the product. 57 parts of soda cellulose containing 20 parts of cellulose in 20% sodium hydroxide were mixed with 77 parts of the above solution containing 20 parts of N-(alpha-chloroethyl)-benzenesulfonamide and heated at 70° C. for 5 hours. The material was acidified, washed with water and dried. A solution was prepared from 4 parts of the above benzenesulfonamidoethyl cellulose, 40 parts of 20% sodium hydroxide solution and 56 parts of crushed ice. A solution of medium viscosity was obtained which contained some fibrous material.

*Example 7.*—A solution of N-(alpha-chlorobutyl)-benzenesulfonamide in dioxan was made by mixing 39.3 parts of benzene-sulfonamide, 150 parts of dioxan, 18 parts of butyraldehyde and 1 part of anhydrous sodium sulfate and passing in 9.9 parts of hydrogen chloride. The solution was clear and contained 28.4% of the product. 57 parts of soda cellulose containing 20 parts of cellulose in 20% sodium hydroxide and aged 72 hours at 18° C. were mixed with 70.5 parts of the above solution containing 20 parts of N-(alpha-chlorobutyl)-benzenesulfonamide. The mixture was heated for 5 hours at 70° C. It was acidified, washed and dried. A white fibrous benzenesulfonamidobutyl cellulose was obtained.

We claim:

1. A cellulose ether soluble in aqueous alkali solutions and containing the group

linked to a carbon of the cellulose through an oxygen atom, wherein R is a hydrocarbon radical of not more than 6 carbon atoms, R' is selected from the group consisting of hydrogen and hydrocarbon radicals of not more than 6 carbon atoms and X represents a group selected from carbonyl and sulfuryl, said ether being obtained by reacting an alkali cellulose with from 5% to 100%, based on the dry cellulose, of an N-alpha-haloalkyl acid amide consisting of the group

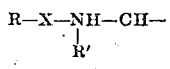

attached to halogen.

2. A cellulose ether soluble in aqueous alkali solutions and containing the group

linked to a carbon of the cellulose through an oxygen atom, wherein R is a hydrocarbon radical of not more than 6 carbon atoms and X is selected from the group consisting of carbonyl and sulfuryl, said ether being obtained by reacting an alkali cellulose with from 5% to 100%, based on the dry cellulose, of an N-halomethyl acid amide consisting of the group R—X—NH—CH$_2$— attached to halogen.

3. A cellulose ether soluble in aqueous alkali solutions and containing the group

linked to a carbon of the cellulose through an oxygen atom, wherein R and R' are hydrocarbon radicals of not more than 6 carbon atoms, said ether being obtained by reacting an alkali cellulose with from 5% to 100%, based on the dry cellulose, of an N-alpha-haloalkyl carboxylic acid amide consisting of the group

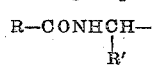

attached to halogen.

4. A cellulose ether soluble in aqueous alkali solutions and containing the group

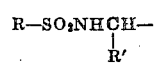

linked to a carbon of the cellulose through an oxygen atom, wherein R and R' are hydrocarbon radicals of not more than 6 carbon atoms, said ether being obtained by reacting an alkali cellulose with from 5% to 100%, based on the dry cellulose, of an N-alpha-haloalkyl sulfonic acid amide consisting of the group

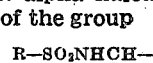

attached to halogen.

5. A cellulose ether soluble in aqueous alkali solutions and containing the group R—CONHCH$_2$— linked to a carbon of the cellulose through an oxygen atom, wherein R is a hydrocarbon radical of not more than 6 carbon radicals, said ether being obtained by reacting an alkali cellulose with from 5% to 100%, based on the dry cellulose, of an N-alpha-halomethyl carboxylic acid amide consisting of the group R—CONHCH$_2$— attached to halogen.

6. A cellulose ether soluble in aqueous alkali solutions and containing the group $$R-SO_2NHCH_2-$$

linked to a carbon of the cellulose through an oxygen atom, wherein R is a hydrocarbon radical of not more than 6 carbon radicals, said ether being obtained by reacting an alkali cellulose with from 5% to 100%, based on the dry cellulose, of an N-halomethyl sulfonic acid amide consisting of the group $R-SO_2NHCH_2-$ attached to halogen.

7. A cellulose ether soluble in aqueous alkali solutions containing the acetamidomethyl group linked to a carbon of the cellulose through an oxygen atom, said ether being obtained by reacting an alkali cellulose with from 5% to 100%, based on the dry cellulose, of an N-halomethyl acetamide.

8. A cellulose ether soluble in aqueous alkali solutions containing the acetamidoethyl group linked to a carbon of the cellulose through an oxygen atom, said ether being obtained by reacting an alkali cellulose with from 5% to 100%, based on the dry cellulose, of an N-alpha-haloethyl acetamide.

9. A cellulose ether soluble in aqueous alkali solutions containing the benzenesulfonamidomethyl group linked to a carbon of the cellulose through an oxygen atom, said ether being obtained by reacting an alkali cellulose with from 5% to 100%, based on the dry cellulose, of an N-halomethyl-benzene sulfonamide.

10. The process of making a cellulose ether which is soluble in aqueous alkali solutions which comprises heating at between 50° and 100° C. an alkali cellulose with from 5% to 100%, based on the dry cellulose of the reaction product of an acid amide $R-X-NH_2$ and an aldehyde $R'CHO$ in the presence of an anhydrous hydrogen halide, R being a hydrocarbon radical of no more than 6 carbon atoms, R' is selected from the group consisting of hydrogen and hydrocarbon radicals of no more than 6 carbon atoms and X is selected from the group consisting of carbonyl and sulfuryl.

JOHN B. RUST.
WILLIAM H. VAN DELDEN.